US006603462B2

United States Patent
Matusis

(10) Patent No.: US 6,603,462 B2
(45) Date of Patent: Aug. 5, 2003

(54) SYSTEM AND METHOD FOR SELECTING FUNCTIONS BASED ON A FINGER FEATURE SUCH AS A FINGERPRINT

(75) Inventor: Alec Matusis, Stanford, CA (US)

(73) Assignee: MultiDigit, Inc., Stanford, CA (US)

( * ) Notice: Subject to any disclaimer, the term of this patent is extended or adjusted under 35 U.S.C. 154(b) by 0 days.

(21) Appl. No.: 09/847,977

(22) Filed: May 2, 2001

(65) Prior Publication Data

US 2002/0163506 A1 Nov. 7, 2002

Related U.S. Application Data

(60) Provisional application No. 60/277,746, filed on Mar. 21, 2001.

(51) Int. Cl.[7] .............................. G09G 5/00; G06K 9/00; H04Q 9/00
(52) U.S. Cl. ....................... 345/173; 345/863; 382/124; 340/5.83
(58) Field of Search ............... 340/5.52, 5.53, 340/5.83, 20, 22; 382/115, 116, 124; 256/71; 345/156, 173, 863

(56) References Cited

U.S. PATENT DOCUMENTS

| | | | |
|---|---|---|---|
| 5,025,705 A | | 6/1991 | Raskin .......................... 84/743 |
| 5,650,842 A | | 7/1997 | Maase et al. |
| 5,767,842 A | * | 6/1998 | Korth ........................... 345/173 |
| 5,825,352 A | * | 10/1998 | Bisset et al. ................. 345/173 |
| 5,864,334 A | * | 1/1999 | Sellers ........................ 345/156 |
| 5,920,642 A | * | 7/1999 | Merjanian ................... 340/5.53 |
| 5,933,515 A | | 8/1999 | Pu et al. |
| 5,982,913 A | | 11/1999 | Brumbley et al. |
| 5,990,803 A | * | 11/1999 | Park ............................ 340/5.53 |
| 5,995,643 A | | 11/1999 | Saito |
| 6,043,805 A | * | 3/2000 | Hsieh ........................... 345/863 |
| 6,067,079 A | * | 5/2000 | Shieh ........................... 345/173 |
| 6,088,585 A | * | 7/2000 | Schmitt et al. ............. 340/5.83 |
| 6,100,811 A | | 8/2000 | Hsu et al. |
| 6,140,939 A | * | 10/2000 | Flick ........................... 340/5.54 |
| 6,141,436 A | * | 10/2000 | Srey et al. ................... 382/124 |
| 6,160,903 A | | 12/2000 | Hamid et al. |
| 6,282,303 B1 | * | 8/2001 | Brownlee .................... 382/124 |
| 6,282,304 B1 | * | 8/2001 | Novikov et al. ............. 382/115 |
| 6,327,376 B1 | * | 12/2001 | Harkin ........................ 382/124 |
| 6,346,929 B1 | * | 2/2002 | Fukushima et al. ......... 345/156 |
| 6,360,004 B1 | * | 3/2002 | Akizuki ....................... 382/124 |
| 6,408,087 B1 | * | 6/2002 | Kramer ........................ 382/124 |
| 6,496,595 B1 | * | 12/2002 | Puchek et al. .............. 382/124 |
| 2001/0055411 A1 | * | 12/2001 | Black .......................... 382/124 |
| 2002/0018585 A1 | * | 2/2002 | Kim ............................ 382/125 |
| 2002/0025062 A1 | * | 2/2002 | Black .......................... 382/116 |
| 2002/0105666 A1 | * | 8/2002 | Sesek .......................... 358/1.14 |
| 2002/0122026 A1 | * | 9/2002 | Bergstrom ................... 345/157 |

* cited by examiner

Primary Examiner—Steven Saras
Assistant Examiner—Paul Bell
(74) Attorney, Agent, or Firm—Lumen Intellectual Property Services, Inc.

(57) ABSTRACT

A system for selecting functions based on a finger feature includes a finger features database storing finger feature and corresponding functions. The system further includes a finger feature sensor, an identification engine and a response engine. The sensor measures a finger feature. The identification engine matches the finger feature with stored features. The response engine then identifies a function in the table corresponding to a matched finger feature. The response engine can then forward an instruction corresponding to the identified function to a device for execution.

6 Claims, 7 Drawing Sheets

| Function | Fingerprint | Minutiae Points Map | Color |
|---|---|---|---|
| Function 1 | 511 | | Blue |
| Function 2 | 512 | | Red |
| Function 3 | 513 | | Green |

310a

| Function | Fingerprint | Minutiae Points Map | Color |
|---|---|---|---|
| Function 1 | 511  |  | Blue |
| Function 2 | 512  |  | Red |
| Function 3 | 513  |  | Green |

| Feature | Motion | Coordinates | Function |
|---|---|---|---|
| Finger Feature 1 | Motion 1 | Section 1<br>Section 2 | Function 1<br>Function 2 |
|  | Motion 2 | Section 1<br>Section 2 | Function 3<br>Function 4 |
| Finger Feature 2 | Motion 1 | Section 1<br>Section 3 | Function 5<br>Function 6 |
|  | Motion 2 | Section 1<br>Section 4 | Function 7<br>Function 8 |

510   610   620   500

310b

SYSTEM AND METHOD FOR SELECTING FUNCTIONS BASED ON A FINGER FEATURE SUCH AS A FINGERPRINT

PRIORITY REFERENCE TO PRIOR APPLICATIONS

This application claims benefit of and incorporates by reference provisional patent application serial number 60/277,746, entitled "SYSTEM AND METHOD TO ALTER FUNCTIONALITY OF BUTTON BASED ON A FINGER FEATURE IDENTIFICATION," filed on Mar. 21, 2001, by inventor Alec Matusis and of U.S. patent application Ser. No. 09/847,977 filed May 2, 2001.

TECHNICAL FIELD

This invention relates generally to input devices, and more particularly, but not exclusively, provides a system and method for selecting functions based on a finger feature.

BACKGROUND

Generally, conventional input keypads and keyboards only allow performance of a single function per key. For example, to display the letter "s" on a computer screen, a user must press the "s" key on a keyboard. In order to increase the number of functions selectable via a keyboard, a key combination must be pressed. For example, to display a capital character, e.g., "S", instead of a lower case character, e.g., "s", the user must press two keys simultaneously, e.g., "Shift" and "s".

While the above-mentioned method may be an acceptable way of selecting functions using a keyboard, it is undesirable in small devices where space is at a premium and where it may be hard to distinguish between keys. For example, in a mobile phone, the space available for a keypad is limited. Accordingly, in order to increase the number of keys on a keypad, the keys are made extremely small thereby making it hard for a user to distinguish between keys.

To assist cell phone users when storing names and corresponding telephone numbers in the cell's phonebook, cell phone designers have linked specific characters to each of the keys on the cell phone keypad. Users can depress a particular key multiple times to shift through characters available by the particular key. For example, to enter the name of "Jim" on a cell phone, the user must depress the "5" key once, the "4" key three times, and the "6" key once. This can be quite a cumbersome process.

Another problem with conventional input devices is that, when the input devices are installed into vehicles, it is generally unsafe for an operator of the vehicle to temporarily cease viewing outside of the vehicle in order to input instructions with the conventional input device. For example, in order to operate a radio receiver, a driver of a car may cease watching for oncoming traffic thereby leading to possible safety hazards due to the driver's inattention to traffic conditions.

Accordingly, a new system and method may be highly desirable that is generally amenable to small input devices without limiting input functionality and/or input devices that can be used without viewing the devices.

SUMMARY

The present invention provides an example system for an input device that allows selection of functions based on a finger-type-mechanism feature or characteristic, where a single user uses several of such finger features to select between the plurality of functions. A simplest example of a finger feature is a human finger. A finger feature may include a fingerprint or a fingertip color, while a finger feature characteristic may include data extracted from a finger feature such as minutiae points.

The system comprises at least one finger feature sensor, a processor, a memory device, and an input/output ("I/O") interface, all interconnected for example by a system bus. The sensor reads a feature of finger, for example, a fingerprint, and feeds the feature to the processor. The processor executes instructions in memory for determining a function based on an analysis and identification of the finger feature. The processor then forwards an instruction corresponding o the determined function to a device for execution.

The present invention further provides a method of selecting a function using the input device based on a finger feature, where a single user uses several of such finger features to select between the plurality of functions. The method comprises the steps of receiving a finger feature from a sensor; finding the closest finger feature match in a database of finger features/characteristics and corresponding functions; and then sending a function command corresponding to the closest matched finger feature to a device for execution.

Accordingly, the system and method allows for replacing a conventional keypad with an embodiment of the present invention with fewer keys. For example, a conventional mobile phone keypad may have ten keys for the numbers 0–9. Using an embodiment of the invention would allow for replacing the ten keys with a single sensor. In the human hand embodiment, each finger of a user's two hands would then be able to activate a different number. For example, the left pinkie finger may be used to indicate "0", the left ring finger may indicate "1", and so forth.

In another embodiment, a dashboard of a vehicle having multiple buttons could be replaced with a single large sensor. For example, different radio presets can be controlled through a single button. Accordingly, a driver could activate different functions by pressing the sensor with a finger corresponding to function wanted, thereby eliminating the need of examining a conventional dashboard to identify the correct button to press. Further, a driver may not be able to operate a dashboard device while driving due to the inability to see buttons due to darkness. Accordingly, using this embodiment of the invention enables a driver to select functions in a dashboard device without the need to identify individual buttons in darkness.

Therefore, the system and method may advantageously allow for replacing a conventional keypad having a large number of keys with a keypad having a smaller number of keys over the same area and having the same functionality of the conventional keypad. Alternatively, the system and method may allow for reducing the size of a conventional keypad by replacing the multiple keys with fewer keys. Alternatively, the same number of keys may be able to make multiple functions available on a single depression.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person skilled in the art to make and use the invention, and is provided in the context of a particular application and its requirements. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
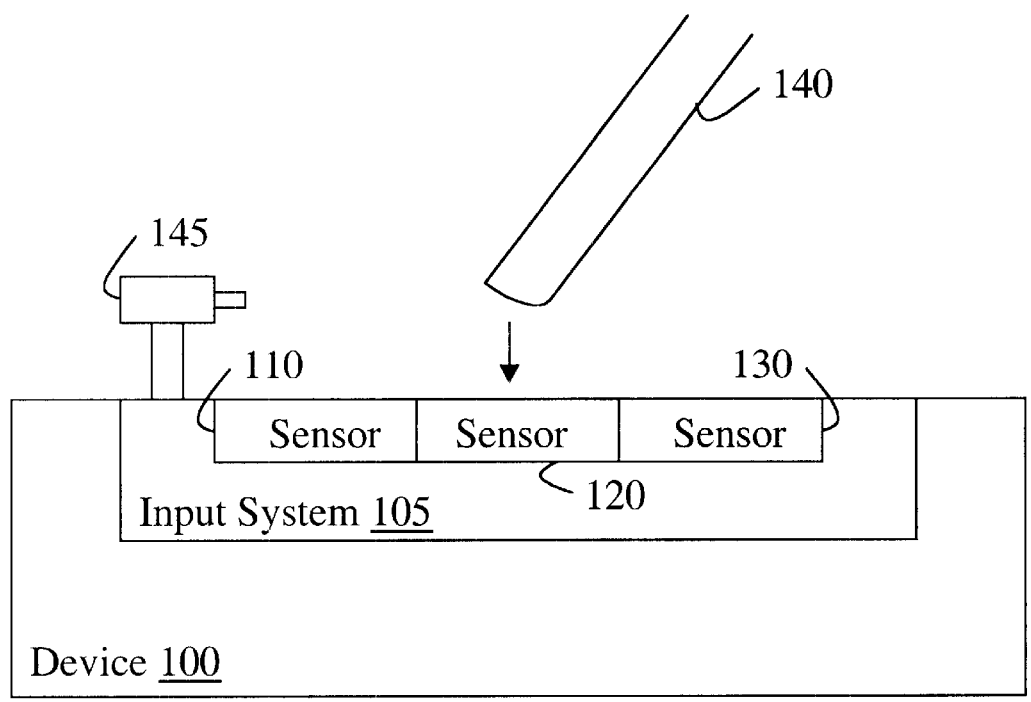
FIG. 1 is a block diagram illustrating a device embodiment.

FIG. 1 is a block diagram illustrating a device 100 for use with an embodiment of the invention. Device 100 is coupled to input system 105. Device 100 may include a mobile phone, a computer, a dashboard of a vehicle, or any other device that makes use of an input system. Input system 105 includes a sensor 110, a sensor 120, a sensor 130 and a sensor 145. Note that the input system 105 must have at least one sensor with no maximum number of sensors. Sensors 110–130 read finger features, such as fingerprints. Sensors 110–130 may also read other data such as coordinates touched (coordinates on a sensor surface touched by a finger) and motion (movement of a finger along a sensor surface), including character recognition. Sensor 145 can read finger features, such as finger color, using a video camera or other device able to read color. Using sensor 145 may require a user to color fingertips or fingernails different colors to allow differentiation. Sensor 145 may continuously scan for finger features or may only be activated when a user touches one of sensors 110–130.

Based on finger feature matching and optionally on coordinate and/or motion analysis, system 105 sends a corresponding command, instruction or function to device 100 as a function of the matched finger feature, and of the optional coordinate and/or motion analysis. For example, if sensor 120 measures a feature of finger 140 indicating that finger 140 is an index finger, then system 105 may send a particular instruction to display the number "7." Alternatively, if finger 140 is a ring finger, then system 105 may send an instruction to device 100 to display the number "9." Sensors 110–130 will be discussed in further detail in conjunction with FIGS. 4A, 4B and 4C.

Figure 2:
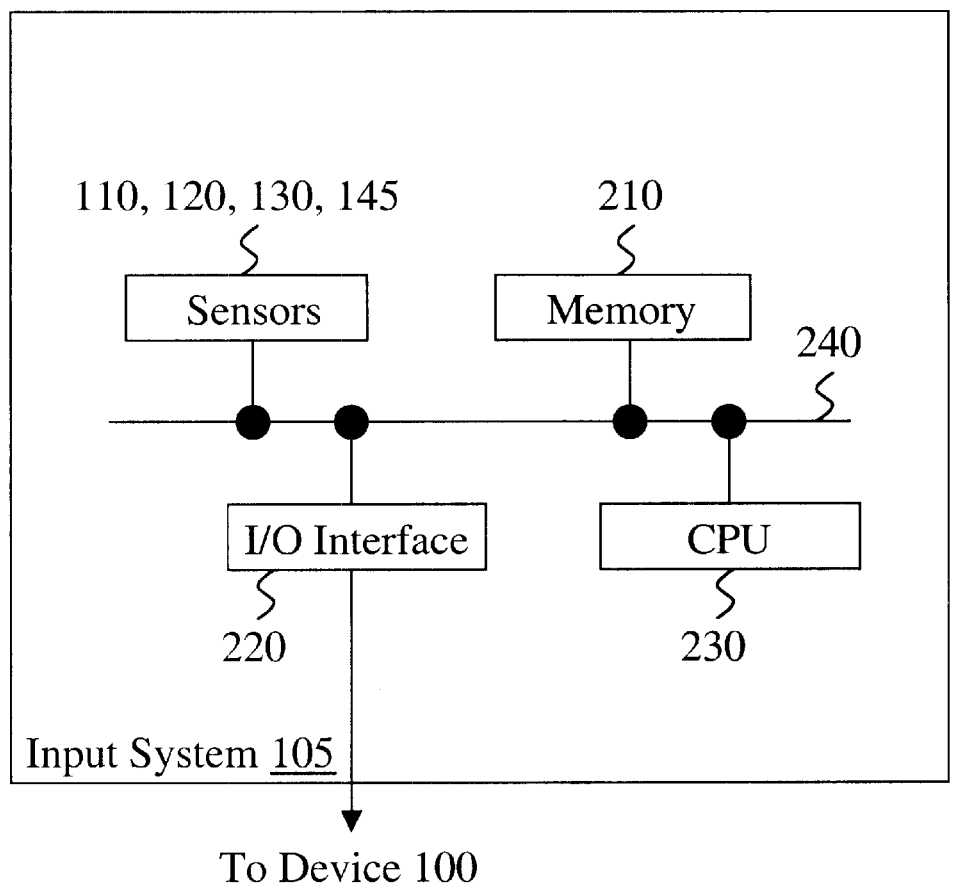
FIG. 2 is a block diagram illustrating an input system.

FIG. 2 is a block diagram illustrating the input system 105. The system 105 includes a central processing unit ("CPU") 230, such as an Intel Pentium® microprocessor or a Motorola Power PC® microprocessor, communicatively coupled to, for example, a system bus 240. The system 105 further includes input sensors 110, 120, 130, and 145 that read finger features, such as fingerprints, I/O interface 220, which is communicatively coupled to device 100, and memory 210 such as a magnetic disk, Random-Access Memory ("RAM"), or other memory device or a combination thereof, each communicatively coupled to the system bus 240. One skilled in the art will recognize that, although the memory 210 is illustrated as an integral unit, the memory 210 can be one or more distributed units. In another embodiment, system 105 may be fully integrated into device 100 so that both system 105 and device 100 use only CPU 230 and memory 210 for all processing and data storage respectively. Accordingly, I/O interface 220 would be optional. It will be appreciated that, although some elements (including steps) are labeled herein as optional, other elements not labeled optional may still be optional.

CPU 230 executes instructions stored in memory 210 for receiving finger feature data from a sensor, generating a closest match of finger feature data to finger feature data stored in a table 310 (FIG. 3) in memory 210, and then sending a function command stored in the table 310 corresponding to the closest match to the device 100. In an alternative embodiment, CPU 230 executes instructions stored in memory 210 for receiving finger feature data from a sensor; identifying finger characteristics, such as minutiae points, from the feature data; generating a closest match of finger characteristic data to finger characteristic data stored in a table 310 (FIG. 3) in memory 210, and then sending a function command stored in the table 310 corresponding to the closest match to the device 100. Memory 210 and the instructions stored therein will be discussed in further detail in conjunction with FIG. 3.

Sensors 110, 120, 130, and 145 may read several different types of finger features besides fingerprints. For example, sensors 110, 120, 130, and 145 may read color and may therefore comprise CMOS or CCD sensors. Therefore a user could paint his or her fingers or fingernails different colors, allowing the system 105 to select a function based on color identification instead of or in addition to other features. Sensors 110, 120, 130, and 145 may also be capable of reading coordinates of a finger touching a sensor and/or motion of a finger along a surface of a sensor.

The sensors 110, 120, 130, and 145 may also each read the same finger features or may each read a different finger features. Alternatively, each sensor may read multiple types of finger features. For example, sensors 110–130 may all read fingerprints or sensors 110, 120 may read fingerprints while sensor 130 may read fingertip color. In another embodiment, sensors 110–130 may read both fingerprints and fingertip color. Examples of commercially available fingerprint sensors include the AuthenTec, Inc. EntréPad™ AES4000™ sensor and the ST Microelectronics TCS1A sensor. In another embodiment, sensors 110–130 may include touch pads or touch screens. Sensors 110–130 will be discussed in further detail in conjunction with FIGS. 4A–4C.

Figure 3:
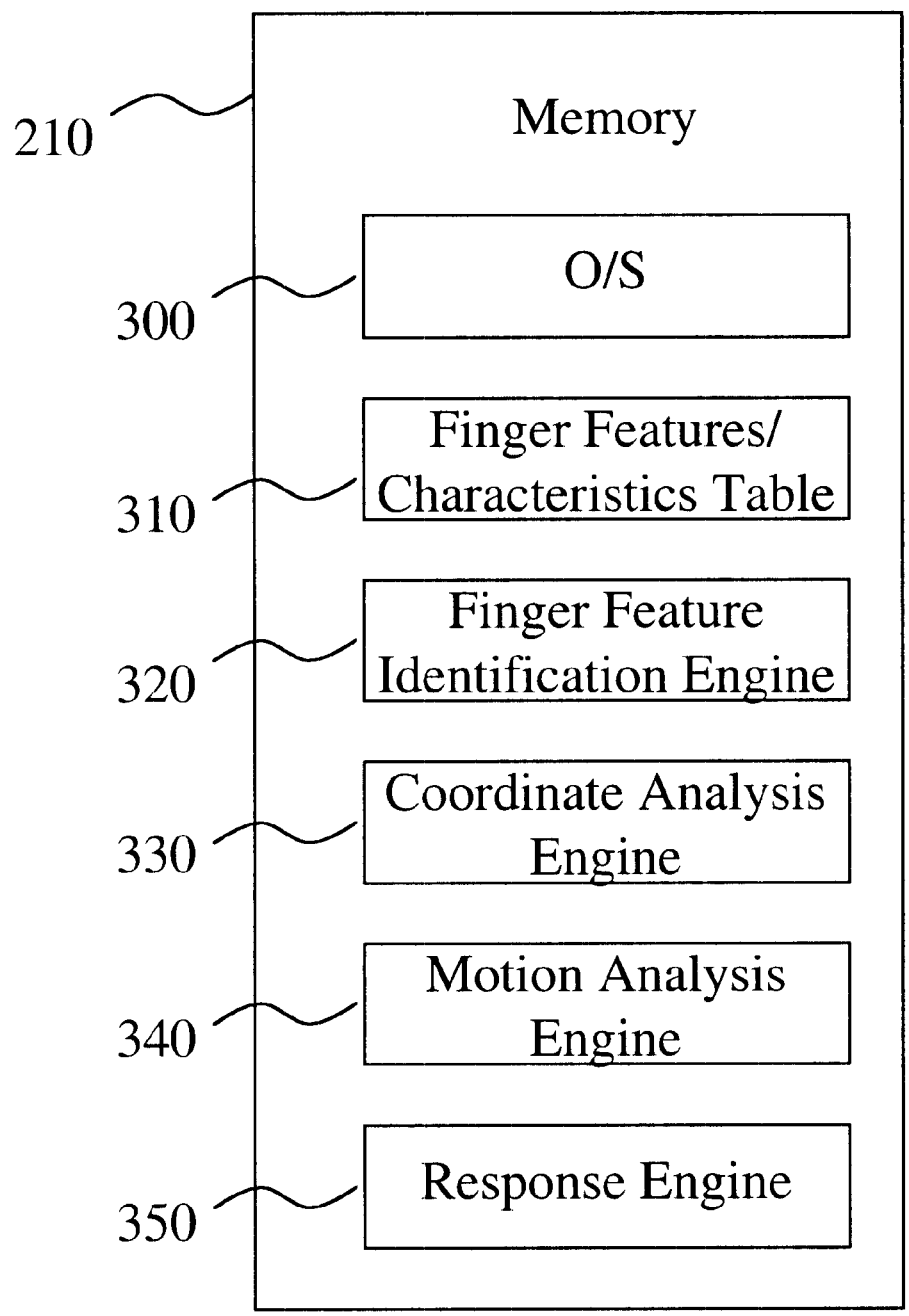
FIG. 3 is a block diagram illustrating contents of a memory device of the system of FIG. 2.

FIG. 3 is a block diagram illustrating contents of memory 210, which includes an operating system ("O/S") 300, such as Linux or other operating system, a finger features/characteristics table 310, a finger feature identification engine 320, an optional coordinate analysis engine 330, an optional motion analysis engine 340, and a response engine 350. Finger features/characteristics table 310 holds a table of finger features and/or characteristics and associated commands and will be discussed in further detail in conjunction with FIGS. 5 and 6.

Finger feature identification engine 320 analyzes finger feature data from sensors 110–130 and generates a closest match of the finger feature data to finger features stored in finger features/characteristics table 310. Identification engine 320 may use a correlation matcher algorithm, or other algorithm, depending on the type of finger feature measured by sensors 110–130. In an alternative embodiment, identification engine 320 may identify finger characteristics, such as minutiae points, from received finger feature data and generate a closest match of the identified finger characteristics to finger characteristics stored in table 310 using a minutiae point matching algorithm in the case of minutiae points, and/or other algorithm.

Coordinate analysis engine 330 determines coordinates of a user's finger touching a sensor, such as sensor 10. For example, a sensor can be divided into several virtual areas and the coordinate analysis engine 330 can identify which virtual area a user's finger has touched. Motion analysis engine 340 analyzes motion of a finger along a sensor surface and may include character recognition technology. Response engine 350 then, based on the closest matched finger feature or characteristic, and optionally on coordinate analysis results and/or motion analysis results, generates a response corresponding to the above-mentioned results as stored in finger features/characteristics table 310. The response engine then may forward the generated response to device 100. The generated response may include a command, such as a command to disable device 100.

Figure 4A:
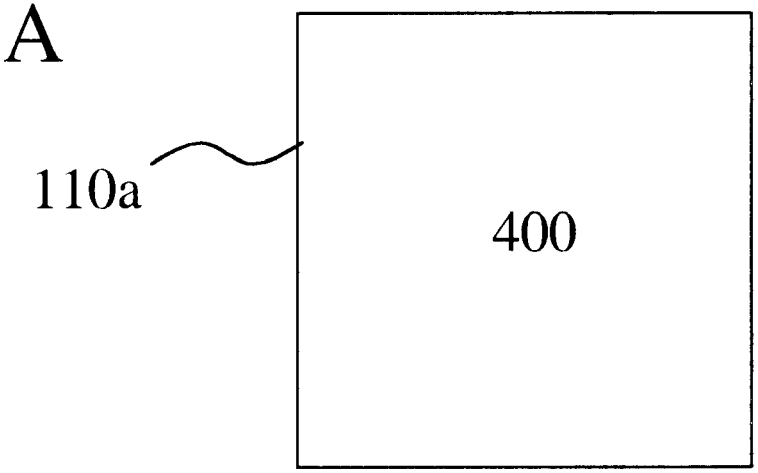
FIGS. 4A–4C are block diagrams of alternative embodiments of a sensor.
Figure 4B:
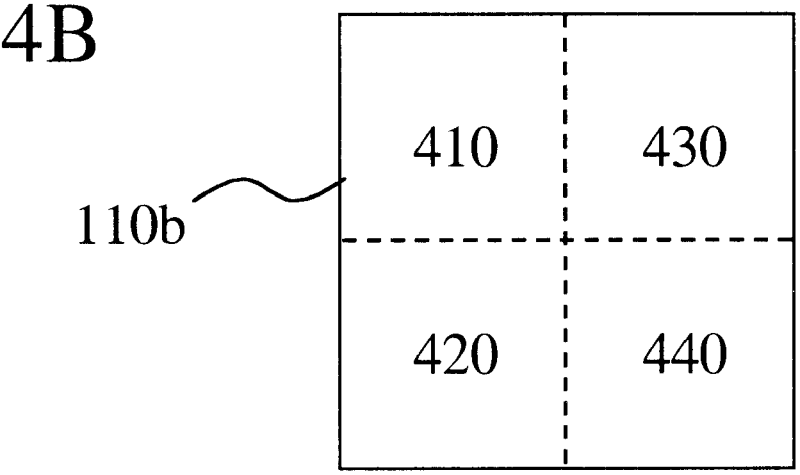
Figure 4C:
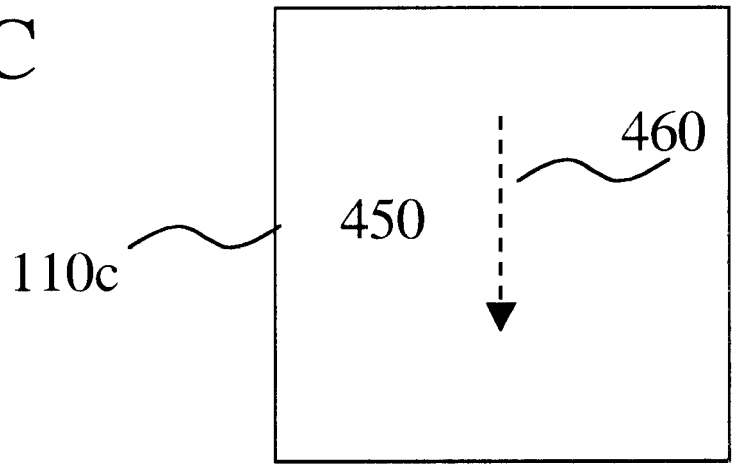

FIGS. 4A–4C are block diagrams of alternative embodiments of sensor 10. Sensor 110*a* may include a conventional fingerprint sensor such as AuthenTec, Inc. EntréPad™ AES4000™ sensor. Sensor 110*a* scans a fingerprint when a user's finger touches sensor 110*a* surface 400. Sensor 110*b* shows an embodiment of sensor 110, wherein the surface of the sensor is divided into virtual quadrants 410, 420, 430 and 440. Sensor 110*b*, in addition to having the ability of scanning a fingerprint, can also read coordinates, which can include determining which virtual quadrant was touched by a finger. Sensor 110*c*, in addition to fingerprint scanning, can perform motion measurement of a finger along the surface of the sensor 110*c*. For example, a finger moving from the top of the sensor 110*c* surface to the bottom of the sensor 110*c* surface, as indicated by arrow 460, can be measured. In addition, sensor 110*c* may be able to perform coordinate measurement.

Figure 5:
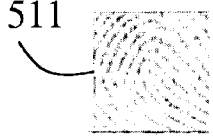
FIG. 5 is a diagram illustrating contents of finger feature table located in the memory device of FIG. 3.
Figure 5:
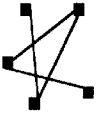
Figure 5:
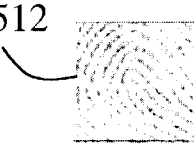
Figure 5:
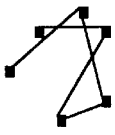
Figure 5:
Figure 5:
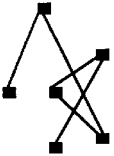

FIG. 5 is a diagram illustrating details of a finger feature/characteristic table 310*a* located in the memory 210. It will be appreciated that, although the structure of element 310*a* is being described as a table, one skilled in the art will recognize that other database structures can be used such as linked lists. Table 310*a* is for a single sensor and includes a single set of functions 500 and a single set of corresponding finger features, such as fingerprints 510*a* or color 510*c*. Alternatively, table 310*a* may include a single set of corresponding finger characteristics, such as minutiae points maps 510*b*. While table 310*a* only comprises a set of three functions, any number of functions and corresponding finger features or characteristics may be stored in table 310*a*. In addition, different users may have finger features stored in table 310*a* thereby allowing multiple users to use a single device.

In order to store finger features or characteristics 510 into table 310*a*, a user stores finger features or characteristics 510 into table 310*a* using an optional initiation engine (not shown) that can be stored in memory 210. The initiation engine uses sensors 110–130 and/or 145 when appropriate, to scan finger features into the table 310*a*. Alternatively, some finger features 510 can be preprogrammed into table 310 before distribution of device 100 to users.

In operation, if a user, for example, touches a finger feature sensor associated with table 310*a*, the sensor will scan the user's finger feature and then finger features identification engine 320 will look up the closest matching finger feature in table 310*a*. Accordingly, if the identification engine 320 determines the closest match is fingerprint 511, then response engine 350 will forward the function 1 command to device 100. If the closest match is fingerprint 513, then the response engine 350 will forward the function 3 to device 100.

Figure 6:
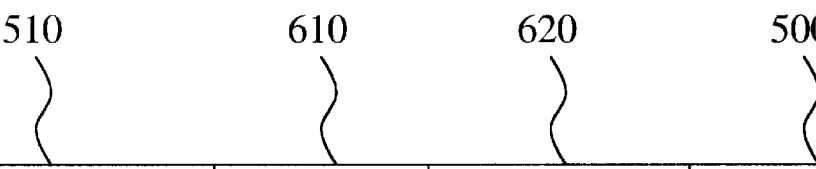
FIG. 6 is a diagram illustrating contents of a finger feature table located in the memory device of FIG. 3 according to another embodiment of the invention.

FIG. 6 is a diagram illustrating contents of a finger feature/characteristic table 310*b* located in the memory 210. Table 310*b* not only includes a set of finger features 510, but also includes motion datasets 610 and coordinates 620. Accordingly, determination of a function from functions 500 is based on not only finger features 510, but also motion datasets 610 and coordinates 620.

Accordingly, during operation of a sensor associated with table 310*b*, the sensor will first read a finger feature, then read motion characteristics as a finger moves along the sensor surface, and then also read origin coordinates of where a finger originally touched the sensor. Alternatively, the measurements of finger feature, motion characteristics, and coordinates can take place in a different order. Therefore, the sensor associated with table 310*b* allows for eight different functions as compared to a conventional button that might only allow for a single function.

Figure 7:
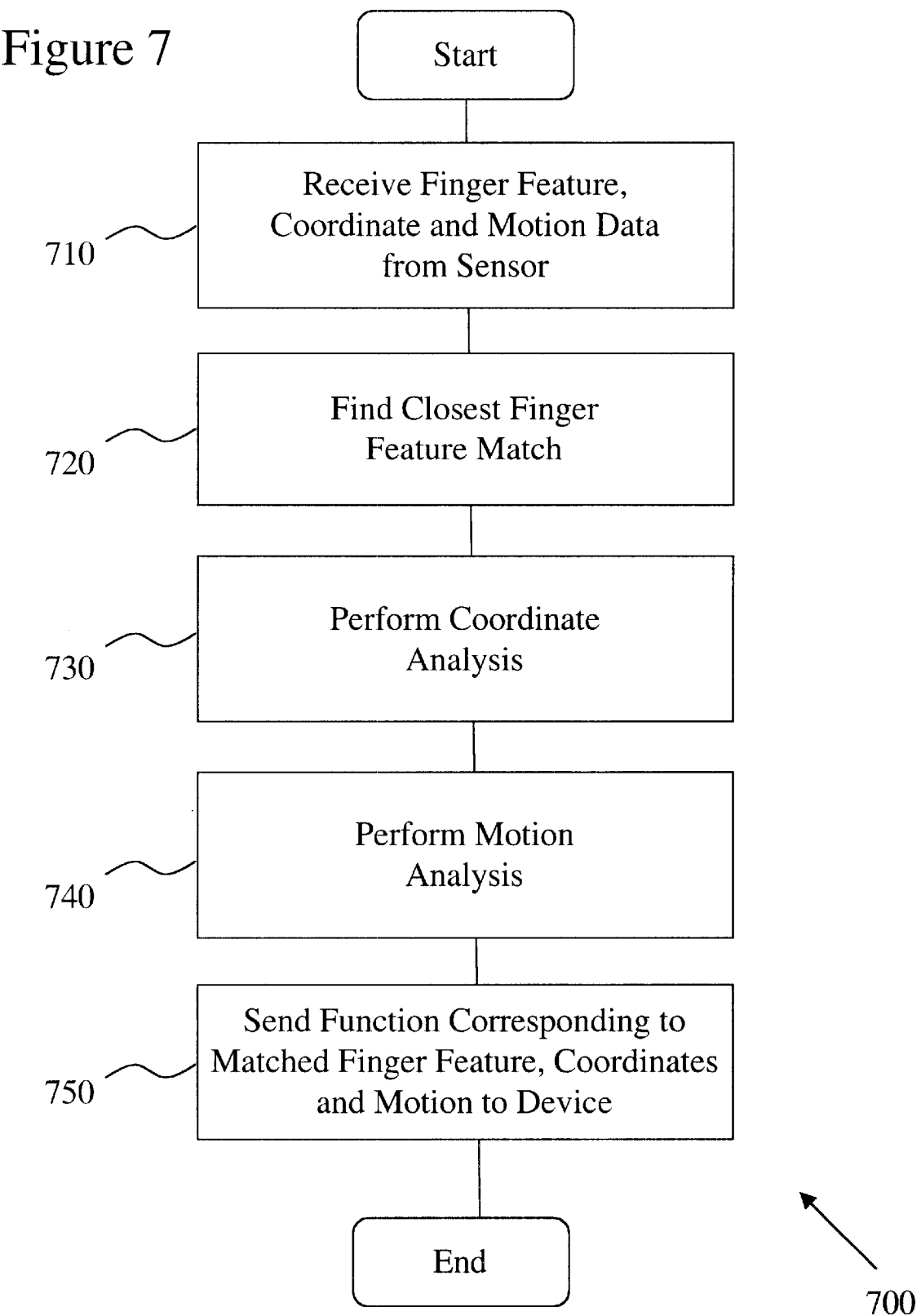
FIG. 7 is a flowchart of a method to select functionality of a button based on a finger feature.

FIG. 7 is a flowchart of a method 700 to alter the functionality of a button based on finger feature identification and other factors. Note that method 700 runs continuously and several instances of method 700 may be running at one time to process data from several sensors and/or to process multiple data received from a single sensor. In one embodiment, method 700 can be performed by identification engine 320, coordinate analysis engine 330, motion analysis engine 340 and response engine 350. First, a finger feature and optionally, coordinate and motion data, from a sensor, such as sensor 110, are received (710). Next, finger feature identification is performed (720), by, for example, finger feature identification engine 320 by matching the received finger feature with a stored finger feature in table 310. In an alternative embodiment, in place of finger feature identification (710), finger characteristic identification may be performed, which comprises identifying finger characteristic data from the received finger feature and then matching the identified characteristic data with stored finger characteristic data in table 310.

Next, coordinate analysis is optionally performed (730), by, for example, coordinate analysis engine 330 by matching the received coordinate data with coordinates, or a region of coordinates in table 310. Next, motion analysis is optionally performed (740) by, for example, motion analysis engine 340 by matching the received motion data with motion data stored in table 310. Note that motion analysis may also include character recognition. In an alternative embodiment, finger feature identification, coordinate analysis and motion analysis can be performed in alternative orders.

After finger feature identification (720) and optional coordinate (730) and motion analysis (740), a function from table 310 corresponding to the matched finger feature or characteristic, optional coordinate and optional motion data is sent (750) to a device, such as device 100. For example, in one embodiment response engine 350 may send a function corresponding to the matched data to device 100. If device 100 is a mobile phone, the function may include dialing the phone, terminating a call, increasing speaker volume, etc. Accordingly, in a small mobile phone, only a single sensor may be needed to implement many different input functions as compared to a conventional ten or more button keypad.

The foregoing description of the illustrated embodiments of the present invention is by way of example only, and other variations and modifications of the above-described embodiments and methods are possible in light of the foregoing teaching. For example, system 105 and device 100 may be fully integrated such that only one CPU 230 and memory device 210 would b needed for both. Further, although function has been described as depending on "finger" features, one skilled in the art will recognize that other features, such as from toes, prosthetic, and sticks, can alternatively control function selection. One skilled in the art should note that the terms "pressing" or "depressing" with regard to keys or buttons should not be limited to buttons or keys that physically depress. Further, component of this invention may be implemented using a programmed general-purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method for selecting functions, comprising:
   (a) providing a one to one relationship between two or more fingers of a user and multiple functions, each of the two or more fingers of the user have a different intrinsic finger feature associated therewith, the intrinsic features are features that are natural to the fingers and are not brought about by any modifications to the fingers;
   (b) providing a sensor, wherein a fixed and discrete location of the sensor is simultaneously associated with the multiple functions;
   (c) alternating between desired functions is achieved by alternating the different fingers at the fixed and discrete location of the sensor; and
   (d) receiving the selected intrinsic finger feature by the sensor to actuate the desired function.

2. The method of claim 1, wherein the finger feature comprises fingerprint data.

3. The method of claim 1, further comprising sending an instruction corresponding to a selected function to a device.

4. The method of claim 1, further comprising executing the selected function.

5. The method of claim 1, wherein the one to one relationship between the intrinsic finger features and the multiple functions comprises motion data from the fixed and discrete location of the sensor.

6. A program storage device accessible by a computer, tangibly embodying a program of instructions executable by the computer to perform method steps for selecting functions, the methods steps comprising:
   (a) providing a one to one relationship between two or more fingers of a user and multiple functions, each of the two or more fingers of the user have a different intrinsic finger feature associated therewith, the intrinsic features are features that are natural to the fingers and are not brought about by any modifications to the fingers;
   (b) providing a sensor, wherein a fixed and discrete location of the sensor is simultaneously associated with the multiple functions;
   (c) alternating between desired functions is achieved by alternating the different fingers at the fixed and discrete location of the sensor; and
   (d) receiving the selected intrinsic finger feature by the sensor to actuate the desired function.

* * * * *